May 29, 1928.
H. C. WEISSE
TEST TANK
Filed Jan. 23, 1926
1,671,333
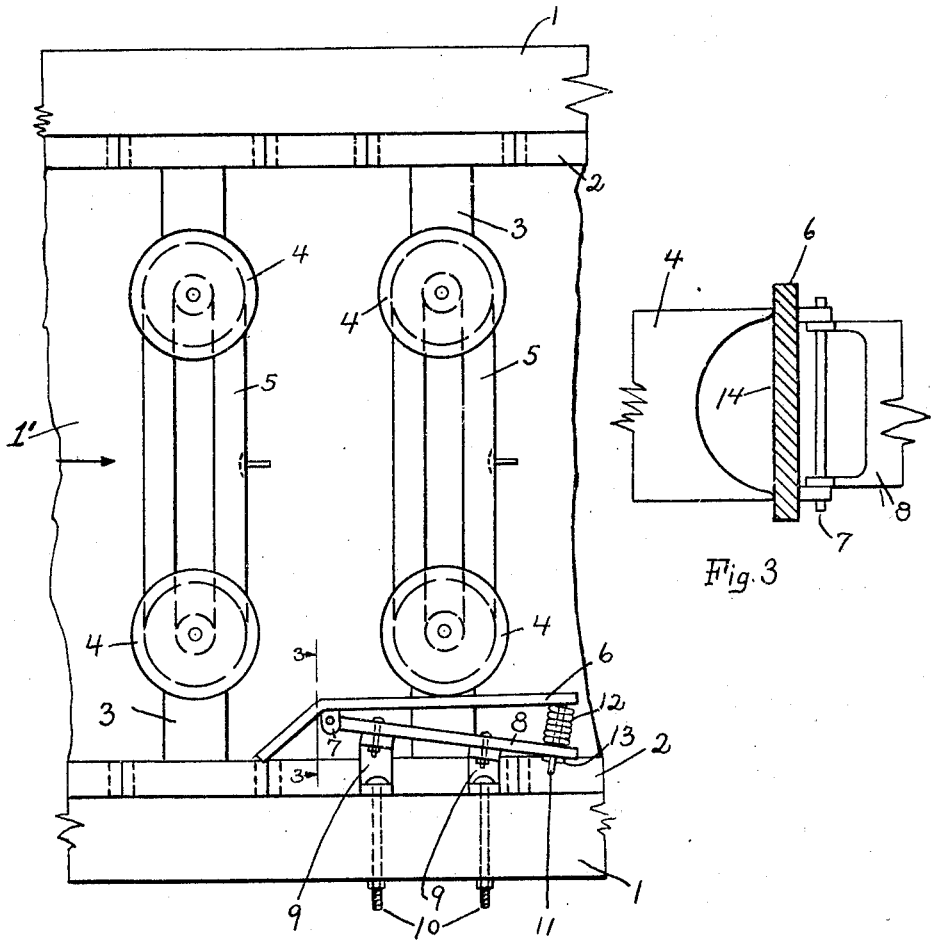
Fig. 1
Fig. 3
Fig. 2
Hugo C. Weisse
Inventor
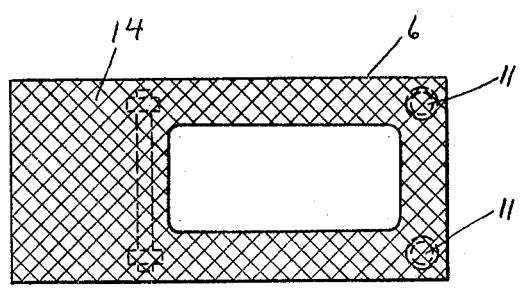
Attorney Patented May 29, 1928.

1,671,333

UNITED STATES PATENT OFFICE.

HUGO C. WEISSE, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

TEST TANK.

Application filed January 23, 1926. Serial No. 83,262.

My invention relates to tanks used in testing inner tubes and has as its object to increase the accuracy of the test and to do away with the necessity of hand manipulation of the tubes as they pass through the tank. More specifically my invention contemplates means for so moving the tubes within the tank that all parts will be subject to inspection. Referring to the drawings which illustrate one embodiment of my invention, Figure 1 is a plan view of a portion of a test tank embodying my invention.

Figure 2 is a front view of the traction element of my device, and

Figure 3 is a section substantially on the line 3—3 of Figure 1.

The type of test tank to which my invention pertains comprises an open oblong tank adapted to be filled to a suitable depth with water and through which the tubes are carried by a conveyor running beneath the surface of the water.

Referring to the drawings 1 designates the sides and 1' the bottom of the tank, 2 represents, conventionally, sprocket chains running through the tank and having supporting bars 3 secured thereto at spaced intervals. Bars 3 support freely rotatable spools 4 about which the partially inflated inner tubes 5 are placed. I find that with the above arrangement as the tubes pass through the water defects occurring in the tube in the portions in contact with the spools do not show up. To obviate this, I provide means for rotating the tube at any convenient point in the tank, preferably, however, at a point substantially midway of the length of the tank. This means comprises a plate 6 pivoted at 7 to a support 8, the latter being bolted to brackets 9 which in turn are secured to the tank by bolts 10. The free end of plate 6 is provided with pins 11 passing through suitable holes in support 8. Compression springs 12 surround the pins and cotter pins or other suitable means 13 are provided to limit the outward movement of plate 6 under the actions of spring 12. In operation as the spools 4 with the tubes thereon advance through the tank, one of the spools rides against plate 6 causing the spool to rotate and thereby rotating the tube 5 carried thereby. The face of plate 6 is preferably knurled as indicated at 14 to provide traction for the spools.

I claim:

1. A device for testing inner tubes comprising a tank adapted to hold a testing liquid, rotatable supporting means for moving a series of tubes through the tank and beneath the surface of the liquid, and means positioned at a point within the tank to rotate the tubes.

2. A device for testing inner tubes comprising a tank adapted to hold a testing liquid, a conveyor provided with pairs of spaced spools adapted to support the tubes to be tested, and movable through the tank beneath the surface of the liquid, and means positioned at a point within the tank for rotating the spools as the latter pass said point.

3. A device for testing inner tubes comprising a tank adapted to hold a testing liquid, a conveyor provided with pairs of spaced spools adapted to support the tubes to be tested, and movable through the tank beneath the surface of the liquid and means positioned at a point within the tank for frictionally engaging one spool of each pair as the latter pass said point to rotate the spools and the tubes supported thereon.

4. A device for testing inner tubes comprising a tank adapted to hold a testing liquid, a conveyor provided with pairs of spaced spools, adapted to support the tubes to be tested, and movable through the tank beneath the surface of the liquid, and means yieldingly mounted on the side of the tank to frictionally engage one spool of each pair as the latter move through the tank, to rotate the spools and the tubes supported thereon.

5. A device for testing inner tubes comprising a tank adapted to hold a testing liquid, a conveyor provided with pairs of spaced spools adapted to support the tubes to be tested, and movable through the tank beneath the surface of the liquid, a plate pivotally mounted on the side of the tank in position to engage one spool of each pair as the latter move past the plate, and means to yieldingly urge the plate into engagement with the spools to rotate the latter and the tubes supported thereon.

6. A device for testing inner tubes comprising a tank adapted to hold a testing liquid, rotatable supporting means for moving a series of tubes through the tank and beneath the surface of the liquid and means, positioned in the tank at a point substantially midway of the latter, to rotate the tubes.

In testimony whereof I have signed my name to the above specification.

HUGO C. WEISSE.